(12) United States Patent
Braakman

(10) Patent No.: US 6,405,849 B1
(45) Date of Patent: Jun. 18, 2002

(54) TRANSPORT DEVICE HAVING A DIVERTING STATION AND MOTOR SUSPENSION FOR A TRANSPORT DEVICE

(75) Inventor: Herman Wichert Theodoor Braakman, Bleiswijk (NL)

(73) Assignee: Klockner Hansel Tevopharm B.V., Schiedam (NL)

( * ) Notice: Subject to any disclaimer, the term of this patent is extended or adjusted under 35 U.S.C. 154(b) by 0 days.

(21) Appl. No.: 09/562,106

(22) Filed: May 1, 2000

(30) Foreign Application Priority Data

Apr. 29, 1999 (NL) ............................................. 1011941
Aug. 23, 1999 (NL) ............................................. 1012876

(51) Int. Cl.$^7$ ............................................. B65G 29/00
(52) U.S. Cl. ...................................... 198/414; 474/117
(58) Field of Search .................................. 198/449, 414, 198/597, 457.05, 733; 474/117, 133, 101, 19

(56) References Cited

U.S. PATENT DOCUMENTS 3,881,370 A * 5/1975 Vogelaar ................ 74/230.17 F
5,098,547 A * 3/1992 Sajczvk ...................... 474/135
6,000,525 A   12/1999 Frulio

FOREIGN PATENT DOCUMENTS

DE    4235369 C1   3/1994
EP    0885821 A1   12/1998

* cited by examiner

Primary Examiner—Kenneth W. Noland
(74) Attorney, Agent, or Firm—Young & Thompson

(57) ABSTRACT

The invention comprises a conveyor device 1, provided with a turning station (3) and a supply belt for supplying products to the turning station in a direction of conveyance with a first orientation. The turning station comprises a cam belt (20) that is rotatable in a closed loop and has cams (28) placed at regular intervals, and also a retaining element (26), for retaining products during the transition from the first track part (24) to the second track part (25). The cams on the belt (20) and the retaining element (26) ensure that at high speeds the products are positioned in an accurate manner during the change of direction. The invention also relates to a motor suspension (30). A drive motor (33) and a drive roller for a conveyor belt are suspended from two arms. With the motor suspension, the belt tension and belt orientation can be adjusted in a simple manner, and the motor can be removed in a simple manner for repair or replacement.

7 Claims, 5 Drawing Sheets

Figure 1:
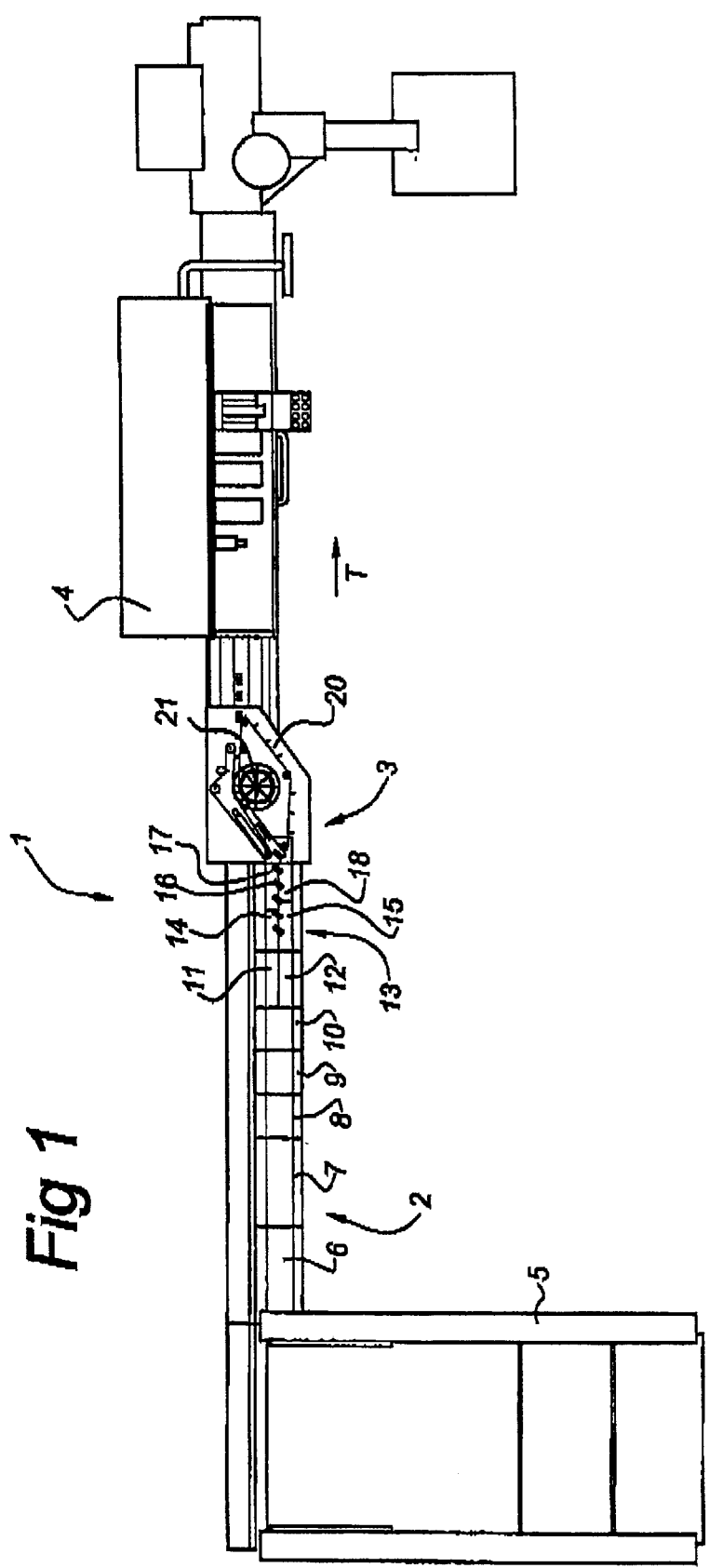

TRANSPORT DEVICE HAVING A DIVERTING STATION AND MOTOR SUSPENSION FOR A TRANSPORT DEVICE

The application relates to a conveyor device provided with:
- a turning station,
- a supply track for supplying products to the turning station, in a direction of conveyance with a first orientation,
- a positioning device situated upstream of the turning station, for turning the products to a take-over orientation, the turning station comprising a belt that is rotatable in a closed loop and has a first track part that is disposed at an angle relative to the direction of conveyance, which belt runs over a guide wheel and comprises a second track part that is situated downstream of the guide wheel and extends in the direction of conveyance. The invention also relates to a motor suspension for a conveyor device.

In packing devices for packing products in a tubular film (flow-wrap pack), products are supplied at a certain pitch to the longitudinal and transverse sealing dies, in order to form a film pack around the products.

Such a conveyor device is known from EP-B-0 218 550. The known device has the disadvantage that the products can slip on the belt and during the transition from the first to the second belt part at relatively high speeds can come off the belt, with the result that the product orientation is upset.

U.S. Pat. No. 2,912,093 discloses a conveyor device in which the belt of the turning station is provided with cams for positioning the products placed thereon. Since the belt of the turning station follows a concave course, viewed in the direction of conveyance, at high speeds the products will be pressed against the belt, so that the problem of products being able to come off the belt when there is a change of direction does not arise here. Since the products are delivered by the belt transversely to the direction of conveyance, a relatively large amount of space will be taken up by the known device. Furthermore, the known device is not suitable for. changing the product orientation relative to the conveyor belts on which the products are supplied and discharged. It is an object of the invention to provide for a simple and efficient turning station for changing the product orientation, for example from an orientation situated transversely to the direction of conveyance to an orientation situated in the direction of conveyance, in the case of which slipping of products on the belt is avoided. It is a further object of the invention to provide for a motor suspension of the drive motor of the conveyor belts, by means of which the tension on the conveyor belts can be adjusted in a simple manner, and by means of which the angle of the conveyor belts can be adjusted in a simple manner. It is a further object of the invention to provide for a motor suspension that can easily be detached from the conveyor belts for maintenance or replacement.

To this end, a conveyor device according to the invention is characterized in that the belt comprises cams placed at regular intervals, a retaining element being situated at a distance from, and substantially parallel to, at least parts of the first and the second track part of the cam belt, in order to retain products during the transition from the first to the second track part.

With the turning station according to the invention, the products can be turned at relatively high speed with an accurately defined pitch. The retaining element ensures that the products are held in a direction situated transversely to the belt and the products are prevented from coming off the belt when there is a change of direction. The retaining element can be designed as a stationary element, or can comprise a retaining belt that is rotatable in a closed loop.

The guide wheel preferably comprises a supporting surface with a first diameter, along which the cam belt runs, and a second supporting surface with a larger diameter than the first supporting surface, along which a retaining belt runs. The products are held on the cam belt between the cams, and also between the cam belt and the retaining belt rotating in synchronism therewith and parallel thereto, so that the products can be conveyed at relatively great angular accelerations around the guide wheel.

A motor suspension for the drive motor of the conveyor belts is preferably characterized in that it comprises two arms connected to each other at an angle, having a tilting point at a common first end of the arms, having at one end of the first arm a drive motor, and having at one end of the second arm a drive roller for a conveyor belt. The weight of the motor on the first arm is balanced by the weight of the drive roller on the second arm. The tension on the conveyor belt can be adjusted in a simple manner by tilting the arms about the tilting point, for example by adding a weight to the drive roller. Furthermore, the motor can easily be replaced by detaching the entire motor suspension.

Owing to the fact that in one embodiment the arms are suspended in the tilting point from a shaft that with a first end is mounted in a rotatable manner in an arm and with a second end is mounted in a sliding manner in a bearing frame, for tilting of the drive roller of the conveyor belt, the inclination of the conveyor belt about its longitudinal axis can be adjusted easily by tilting the shaft of the motor suspension.

Figure 2:
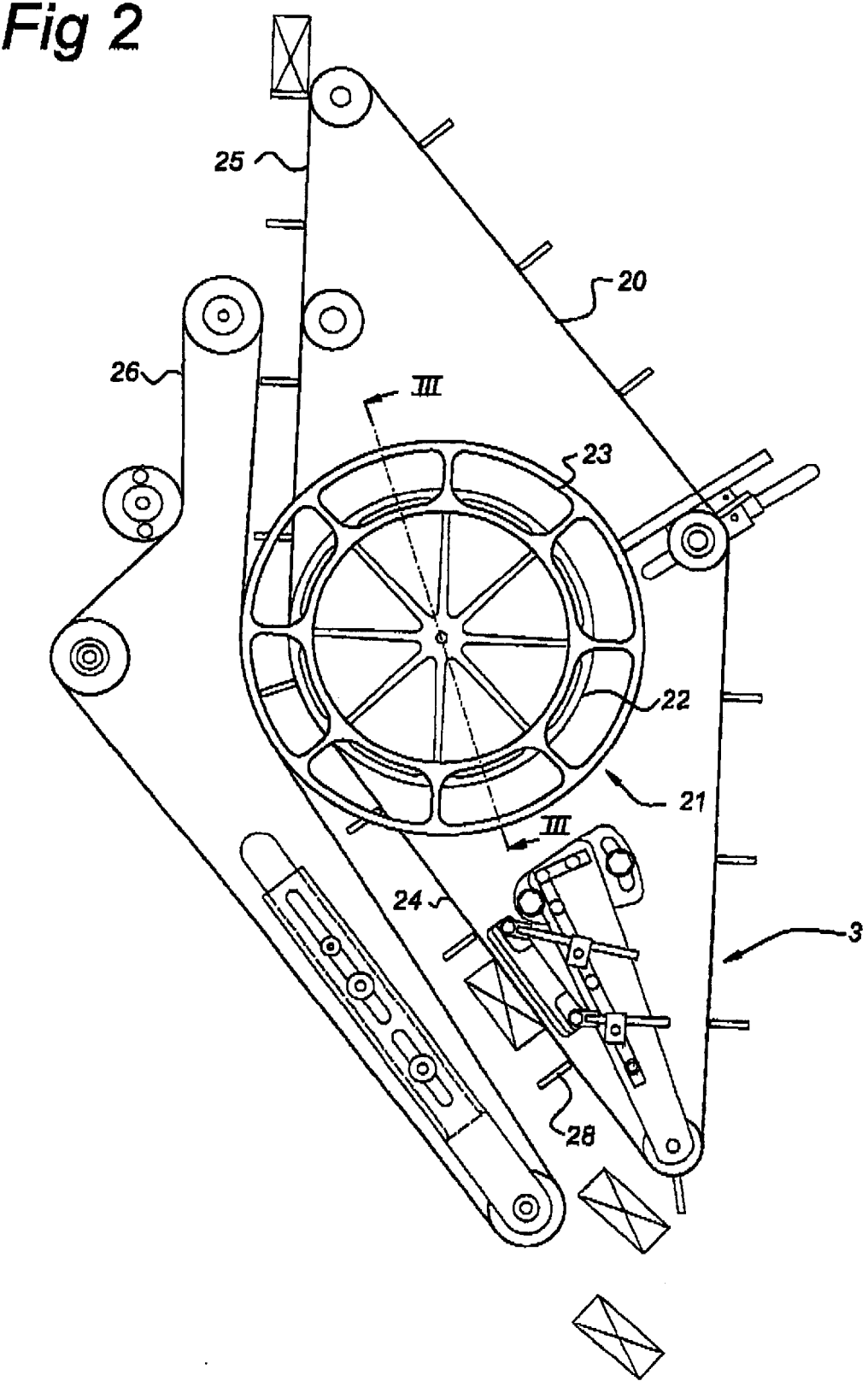
Figure 3:
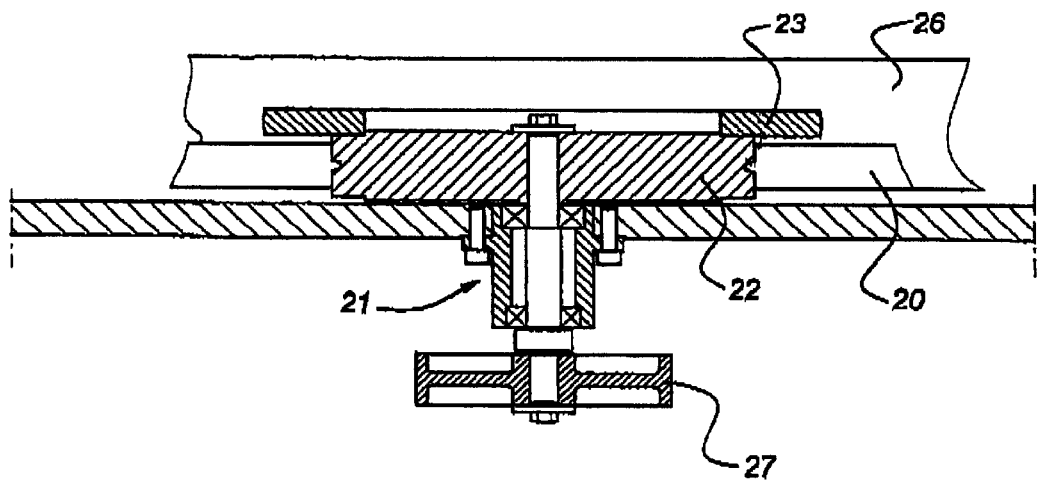
Figure 4:
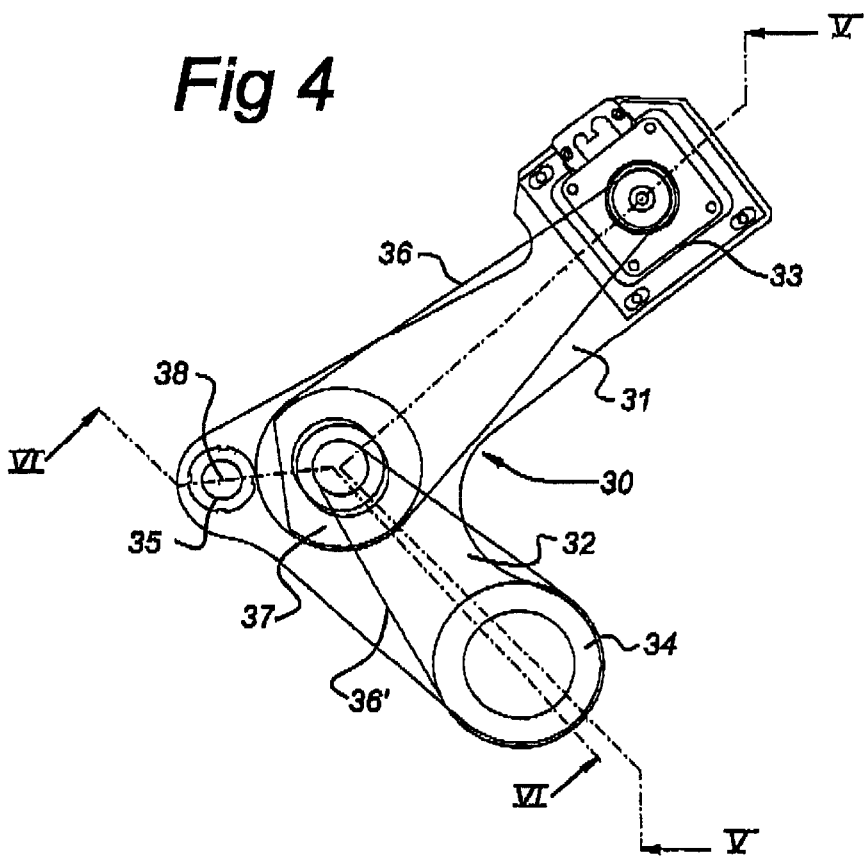
Figure 5:
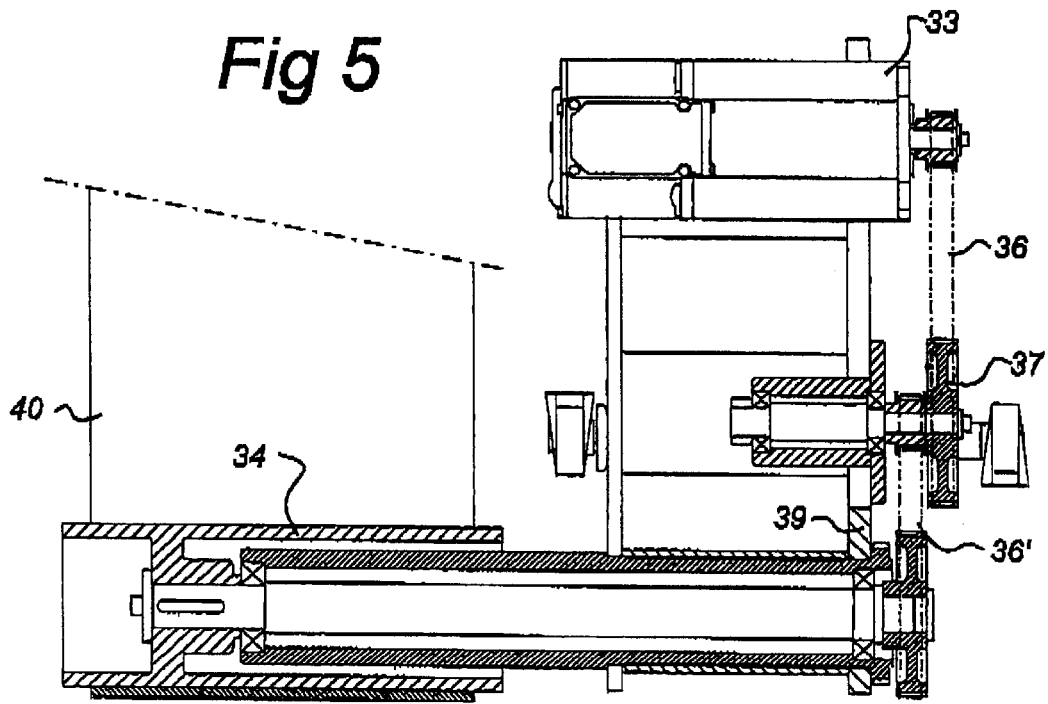
Figure 6:
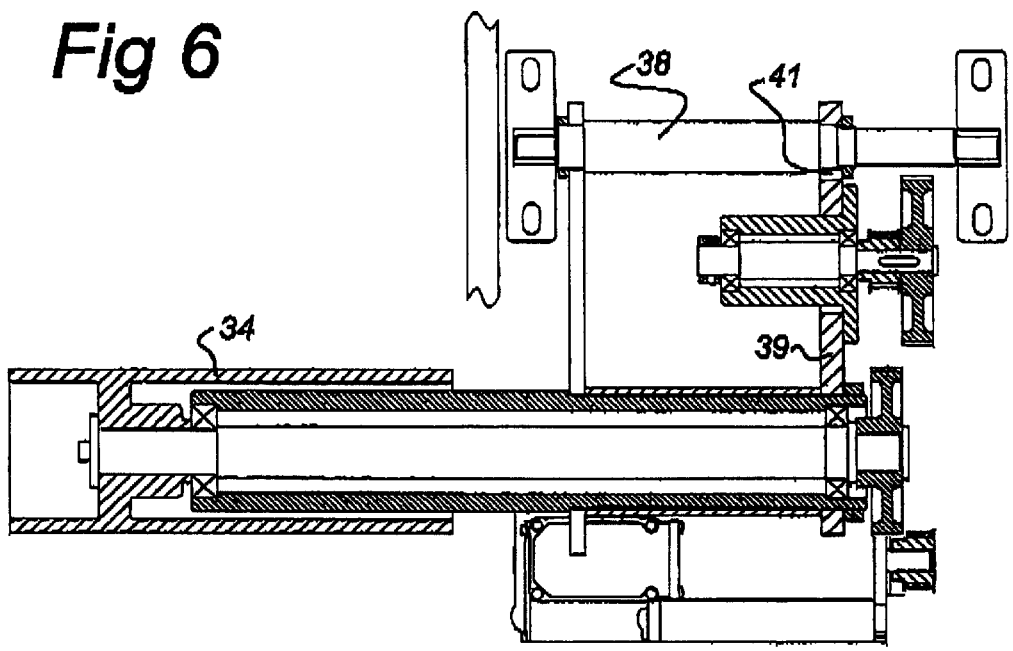
Figure 7:
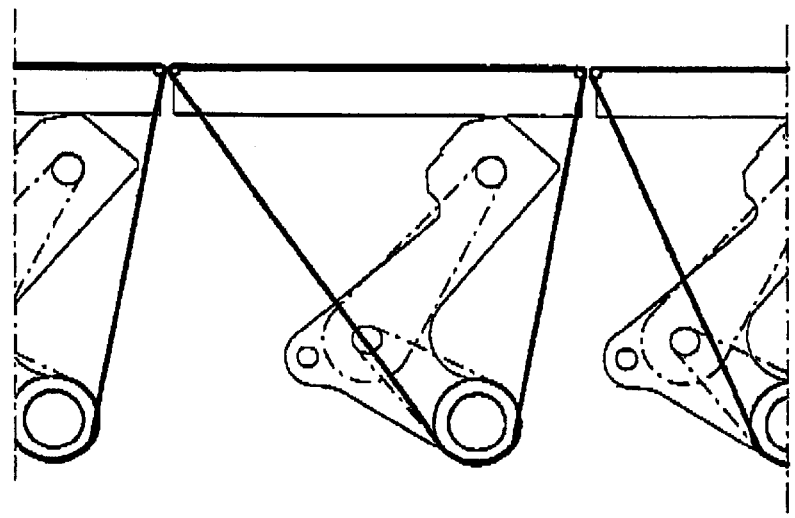

An embodiment of a conveyor device and of a motor suspension according to the invention will be explained in further detail with reference to the appended drawing, in which:

FIG. 1 shows a top view of a conveyor device provided with a turning station according to the invention, FIG. 2 shows a view of the turning station according to FIG. 1 on an enlarged scale, FIG. 3 shows a section along the line III—III in FIG. 2, FIG. 4 shows a side view of the motor suspension according to the invention, FIG. 5 shows a section along the line V—V in FIG. 4, FIG. 6 shows a section along the line VI—VI in FIG. 5, and FIG. 7 shows a side view of a number of conveyor belts, each provided with a motor suspension according to FIG. 4.

FIG. 1 shows a conveyor device 1, with a supply belt 2 for supplying products in a first product orientation to a turning station 3. In the turning station 3, the product orientation is changed, after which the turned products are supplied to a packing station 4. In the packing station 4, the products are placed in a tubular film, from which individual packs are formed by the production of transverse seals.

The products are fed in on a drop belt 5, transversely to the direction of conveyance T. The products are deposited in the form of a row from the drop belt 5 onto the conveyor belt, in the course of which the drop belt stops briefly and the other belts remain running. This results in spaces being produced between the deposited rows of products.

In order to close up the spaces between successive rows of products, switching belts 6, 7, which can rotate at high speed or at low speed, are provided. By switching between the high speed at the position of a space between successive products at a belt transition between the belts 6, 7 and low speed when a product is present at the belt transition between the belts 6, 7, the spaces between products are closed up at said belt transition.

The products are formed into a continuous row on the buffer belts 8, 9, 10. The buffer belts 8, 9, 10 rotate at high speed so long as they are empty, and at lower speed if there is a product on the belts. The products are subsequently transferred to a shifting device or positioning device 13. The positioning device 13 comprises two position-controlled belts 11, 12, which always deliver 1 product per phase. If the supplied products are lying out of alignment, this is corrected by making the belts 11, 12 run at differing speeds. The speed of the belts 11, 12 is higher than the speed of the buffer belts 8, 9, 10, so that a space is produced between the products.

The belts 14, 15 have a fixed speed difference, so that the products 16 undergo a first turning. Owing to the staggered belt transition with belts 17, 18, which likewise turn at different speeds from each other, the product turning is completed. The device according to the invention could be designed without the positioning device 13, so that the products arrive at the turning station 3 in a position at right angles to the direction of conveyance and are oriented obliquely along this belt by the cam belt 20. However, this lowers the speed of processing.

In the turning station 3, the products are picked up by a cam belt 20 and rotated along a guide wheel 21, so that the product orientation changes and the products are supplied to the packing station 4 oriented in the longitudinal direction.

As can be seen clearly from FIG. 2, the guide wheel 21 comprises a first supporting surface 22. A first track part 24 of the cam belt 20 is deflected by the first supporting surface 22 and passes into a second track part 25. The cam belt 20 comprises cams 28 placed at regular intervals. A retaining belt 26 runs over a second supporting surface 23 of the guide wheel 21, and is driven in rotation together with the cam belt 20 by the guide wheel.

FIG. 3 shows the retaining belt 26, the cam belt 20 and the guide wheel 21 with the first supporting surface 22 and the second supporting surface 23. The retaining belt 26 is broader than the cam belt 20, so that both belts can be deflected over the guide wheel 21. The width of the retaining belt 26 is dimensioned in such a way that the axis of said belt runs over the second supporting surface 23, so that the retaining belt does not ultimately lie out of alignment. The drive wheel 21 is rotated by way of a drive pulley 27.

FIG. 4 shows the motor suspension 30 with a first arm 31 and a second arm 32. An electric motor 33 is fixed on one end of the first arm 31. A drive roller 34 for driving a conveyor belt 40, as shown in FIG. 5, is fixed on the end of the arm 32. The motor 33 is connected to the drive roller 34 by way of a transmission pulley 37 and drive belts 36, 36'. The arms 31, 32 are suspended in the tilting point 35 from a supporting frame 39 by means of a shaft 38, as can be seen clearly from FIG. 6. As can be seen from FIG. 6, one end of the shaft 38 can be moved in a slot 41 in the supporting frame 39, so that the drive roller 34 can be tilted relative to the supporting frame 39, for setting the angle of the conveyor belt 40.

FIG. 7 shows the suspension of a number of motors of connecting conveyor belts.

What is claimed is:

1. Conveyor device (1) provided with a turning station (3),
 a supply track (6, 7, 8, 9, 10, 11, 12) for supplying products to the turning station, in a direction of conveyance (T) with a first orientation,
 a positioning device (13) situated upstream of the turning station (3), for turning the products to a take-over orientation, the turning station comprising a belt (20) that is rotatable in a closed loop and has a first track part (24) that is disposed at an angle relative to the direction of conveyance (T), which belt (20) runs over a guide wheel (21) and comprises a second track part (25) that is situated downstream of the guide wheel (21) and extends in the direction of conveyance (T), characterized in that the belt (20) comprises cams (28) placed at regular intervals, a retaining element (26) being situated at a distance from, and substantially parallel to, at least parts of the first and the second track part (24, 25) of the cam belt (20), in order to retain products during the transition from the first (24) to the second track part (25).

2. Conveyor device (1) according to claim 1, characterized in that the retaining element comprises a retaining belt that is rotatable in a closed loop, the guide wheel (21) having a supporting surface (22) with a first diameter, along which the cam belt runs, and a second supporting surface (23) with a larger or smaller diameter than that of the first supporting surface (22), along which the retaining belt runs.

3. Conveyor device (1) according to claim 1, characterized in that the positioning device (13) comprises two parallel conveyor tracks (14, 15, 17, 18) that are movable at different speeds.

4. Conveyor device (1) according to claim 1, characterized in that a buffer device (8, 9, 10) for grouping the products into a continuous row is provided upstream of the positioning device (13).

5. Conveyor device (1) according to claim 4, characterized in that a switching device (6, 7) is provided upstream of the buffer device (8, 9, 10), for reducing a distance between products.

6. Turning station (3) having a belt (20) that is rotatable in a closed loop and has a first track part (24) that is disposed at an angle relative to a direction of conveyance (T), which belt (20) runs over a guide wheel (21), and a second track part (25) that is situated downstream of the guide wheel (21) and extends in the direction of conveyance (T), characterized in that the belt (20) comprises cams (28) placed at regular intervals, a retaining element (26) being situated at a distance from, and substantially parallel to, at least parts of the first and the second track part (24, 25) of the cam belt (20), in order to retain products during the transition from the first (24) to the second track part (25).

7. Motor suspension (30) for a conveyor device, comprising two arms (31, 32) connected to each other at an angle, having a tilting point (35) at a common first end of the arms, having at one end of the first arm (31) a drive motor (33), and having at one end of the second arm (32) a drive roller (34) for a conveyor belt, said arms (31, 32) being suspended in the tilting point (35) from a shaft (36) that with a first end is mounted in a rotatable manner in a supporting frame (39) and with a second end is mounted in a sliding manner in a supporting frame (39), for tilting of the drive roller (34) of the conveyor belt.

\* \* \* \* \*